United States Patent [19]

Koski et al.

[11] 4,015,799
[45] Apr. 5, 1977

[54] ADAPTIVE REEL-TO-REEL TAPE CONTROL SYSTEM

[75] Inventors: John Alexander Koski; Rudolf Werner Lissner; Spencer Donald Roberts, all of San Jose, Calif.

[73] Assignee: International Business Machines Corporation, Armonk, N.Y.

[22] Filed: Nov. 14, 1975

[21] Appl. No.: 631,808

[52] U.S. Cl. .................................. 242/203; 318/7
[51] Int. Cl.[2] ..................... G03B 1/04; G11B 15/32
[58] Field of Search ........... 242/203, 206, 208–210, 242/183–186; 318/6, 7; 324/158 R; 360/69, 71–73

[56] References Cited

UNITED STATES PATENTS

| | | | |
|---|---|---|---|
| 3,834,648 | 9/1974 | Rose, Jr. et al. | 242/186 |
| 3,910,527 | 10/1975 | Buhler et al. | 242/186 |
| 3,938,041 | 2/1976 | Louth et al. | 324/158 R |

Primary Examiner—Leonard D. Christian
Attorney, Agent, or Firm—Owen L. Lamb; Henry E. Otto, Jr.

[57] ABSTRACT

A reel-to-reel web (tape) transport apparatus which has no tape length buffering between the supply and take-up reels. The tape follows a fixed length path from the supply reel, past a read/write head and guides, to a take-up reel. A two motor control mechanism is employed in which one motor drives the take-up reel and one motor drives the supply reel to maintain the appropriate tension and tape motion at the read/write head. The control mechanism is adaptive to dynamic changes as the tape is moved from the supply reel to the take-up reel. Three quantities are monitored: lineal tape position and the angular reel displacement of the supply and take-up reel. From these quantities reel radii are derived, tape inertia calculated and the velocity or position error is determined. A motor current algorithm is utilized to generate the appropriate torque for each reel to drive the control error to zero along a predetermined profile with negligible tape tension disturbances. The result is a reel-to-reel tape drive with static and dynamic performance characteristics which are independent of reel radius and inertia changes resulting from tape motion.

12 Claims, 5 Drawing Figures

ADAPTIVE REEL-TO-REEL TAPE CONTROL SYSTEM

BACKGROUND OF THE INVENTION

Field of the Invention

The invention relates to web drive systems, and more particularly to direct reel-to-reel web transports which have no web length buffering means to decouple web motion at the head from web motion at the reels.

Transports for web-like material, such as magnetic recording tape, in the past have been mainly characterized as buffered or unbuffered. In a buffered transport, tape is delivered from the supply reel to a mechanical buffer or a vacuum column buffer to decouple the tape motion at a drive capstan from the supply reel. The drive capstan drives the tape over a read/write recording head to another buffer which decouples the tape from a take-up reel. From the second buffer, the tape is wound upon the take-up which is driven by a take-up reel motor. These systems tend to be very expensive and therefore a simpler type of system wherein the tape is unbuffered has been employed. In an unbuffered system, the tape extends from the supply reel to the take-up reel past the read/write station. The speed, position and tension of the tape as it passes through the read/write station must be accurately controlled and this is done by controlling the two reel motors.

In prior apparatus, the control of the motors is accomplished by two tape tension sensors, one on each side of the tape head. Alternatively, the speed of the take-up capstan is controlled from a recording head which senses a prerecorded track on the tape. Or in still other prior art devices, a tape speed tachometer controls one reel motor and a tape tension transducer controls the other reel motor.

None of the above systems are truly adaptive in that they lack the total ability to maintain predetermined control objectives dynamically as the amount of tape on each reel changes with time. This is especially important when controlling large diameter tape reels which exhibit a significant change of tape reel radius during operation.

It is therefore an object of this invention to provide a reel-to-reel web transport system which is of low cost and high reliability.

It is a further object of this invention to provide an adaptive reel-to-reel web control system which is capable of maintaining predetermined control parameters as the amount of tape on each reel changes with time.

It is a further object of this invention to provide a web motion control system in which equal tangential motion trajectories are maintained for each reel.

A further object of this invention is to provide a web control apparatus which maintains equal tensioning forces on a web driven directly from reel-to-reel.

Another object of the invention is to provide a tape motion control apparatus which provides a closed loop high-speed rewind and forward search.

SUMMARY OF THE INVENTION

The above objects are accomplished in accordance with the invention by providing electronic control apparatus in which digital tachometers sense the angular position of the supply and take-up reel and the lineal tape position. Each reel tachometer signal is processed to derive sampled tachometer periods from which reel radii are derived. These parameters are utilized by an arithmetic unit which calculates the appropriate error-connecting currents which are supplied to the motor drive circuits to drive the control error to zero.

In accordance with an aspect of the invention, the control apparatus maintains tape motion control as the amount of tape on each reel changes with time by storing inertial values corresponding to predetermined increments of tape radius. The radius of tape wound on the reels is sensed to provide signals corresponding to the predetermined increments of reel radius, the signals being used to select from the stored inertial values the inertial value corresponding to the instantaneous reel radius. The inertial value is then used in producing appropriate instantaneous physical system responses to provide motion control of the tape.

The invention has the advantage that it eliminates vacuum columns or other tape buffering means.

The invention has the further advantage that the tape radius is measured in a completely digital manner by using digital revolution sensors in conjunction with a digital-encoder tape tachometer to thereby provide a more precise means of tape tension control.

The invention has the further advantage that acceleration and deceleration currents are controlled by an algorithm and therefore are adaptive.

The invention also has the advantage in that it allows complete control in all modes of operation, acceleration, deceleration, velocity control and start/stop and is fully adaptive to different amounts of tape on the tape reel.

The foregoing and other objects, features and advantages of the invention will be apparent from the following detailed description of a preferred embodiment of the invention as illustrated in the accompanying drawings wherein.

GENERAL DESCRIPTION

Figure 1:
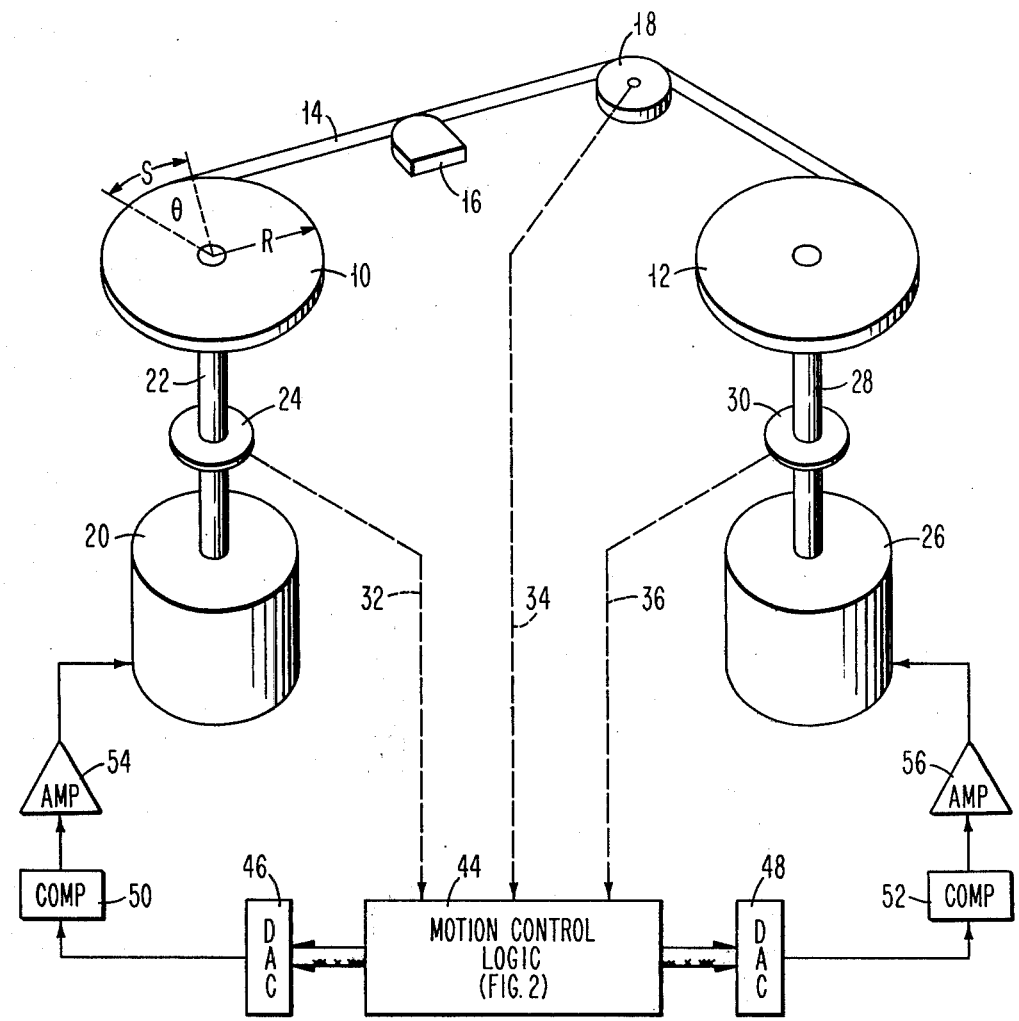
FIG. 1 is an overall block diagram of a tape motion control apparatus in which the present invention is embodied.

Referring to FIG. 1, a reel-to-reel web transport control apparatus is shown. Web material such as magnetic recording tape is wound upon a supply tape reel and is spooled off onto a take-up reel. The tape moves past and is partially wrapped around a free rolling idler wheel which is coupled to a tape tachometer.

The supply tape reel is coupled to a motor driven shaft and a supply reel tachometer is coupled to the shaft. Similarly, a motor drives the take-up reel and a take-up reel tachometer is coupled to the motor shaft.

The output of the supply reel tachometer and the output of the tape tachometer are connected to radius sensing logic which logically derives sampled supply reel radius.

A similar arrangement is utilized to derive take-up radius by means of the take-up reel tachometer.

The output of the tape tachometer is also supplied to logic which derives sampled tachometer period. These three variables, the supply and the take-up reel radii and tape tachometer period are used in motion control logic to derive the proper error correcting current for the supply and take-up reel motors in the following manner. The sampled reel radii are used in a table look-up to obtain instantaneous reel inertial values. The tape tachometer period is matched against a nominal reference period to obtain a tape servo period error. The error and reel inertia are multiplied together to obtain an acceleration current which is added to a friction current and a tension current, all of which are in digital form. The summation of these currents at output of the motion control logic is also in digital form and drives digital-to-analog converters. The outputs of the digital-to-analog converters are fed to filters and power amplifiers which drive the reel motors thus forming a closed loop motion control system.

In order to more clearly describe the various elements of the invention and the detailed circuit diagrams of FIGS. 2–5, a theoretical background discussion is given below.

THEORETICAL BACKGROUND AND DESCRIPTION

The mass moment of inertia for a tape reel is $$J_{reel} = J_{hub} + J_{tape}$$

where:
$J_{hub}$ is constant and
$J_{tape}$ is calculated from the annular ring equation, $$J_{tape} = \frac{\rho W \pi}{2} R^4 - R_0^4.$$

where:
$R_0$ = hub radius
$R$ = tape radius
$W$ = tape width
$\rho$ = tape mass density
Since $\rho$, $W$, $\pi$, $R_0$ are constants, $$J_{tape} = C_1 R^4 - C_2$$

and $$J_{reel} = C_1 R^4 - C_2 + C_3.$$

where $C_1$, $C_2$ and $C_3$ are constants.

Torque-driven Tape Reel Under Tension

The following is a derivation of motor currents required to drive a single tape reel at constant acceleration rate $\ddot{x}$.

Let:
$T_m$ = motor torque
$T_{ten}$ = torque due to tape tension
$T_{visc}$ = viscous torque
$T_{coul}$ = coulomb torque
$J_0$ = empty-reel inertia Sum of torques = $J\ddot{\theta}$ $$T_m - T_{ten} - T_{visc} - T_{coul} = (J_0 + J_{tape}) \ddot{\theta}.$$

Solving for motor torque, $$T_m = (J_0 + J_{tape}) \ddot{\theta} + T_{ten} + T_{visc} + T_{coul}$$

-continued $$= \ddot{x} \left( C_1 \frac{R^4 - C_2}{R} + \frac{J_0}{R} \right) + F_{ten} R + T_{visc} + T_{coul}.$$

Dividing through by the motor torque constant $K_T$ gives motor current, $I_m$.

$$I_m = \frac{\ddot{x}}{K_T} \left( C_1 \frac{R^4 - C_2}{R} + \frac{J_0}{R} \right) + \frac{F_{ten} R}{K_T} + \frac{T_{visc} + T_{coul}}{K_T} \quad (1)$$

$$I_m = I_{accel} + I_{ten} + I_{drag}$$

where
$R$ is computed from tachometer pulses
$\ddot{x}$ is desired tangential acceleration
$F_{ten}$ is desired tape tension
$T_{visc}$ and $T_{coul}$ are assumed values Equation 1 provides the basis for the control algorithms which drive both reels $I_m$ is separated into three motor current components needed for acceleration, tensioning, and drag.

Because $I_{accel}$ is a highly nonlinear function of reel radius, a coefficient table look-up procedure is necessary. The nonlinear inertial values are stored and addressed by radius, and the required currents are calculated by a binary multiplication.

$I_{ten}$ is the motor current needed to create a given tension force in the tape, and is a linear function of reel radius R.

$I_{drag}$ is the motor current needed to compensate for both coulomb and viscous frictions. This is a function of reel radius and velocity direction.

Velocity Control Algorithm

To control velocity in the closed-loop system, $I_{accel}$ components of equation 1 (for each motor) is modulated with tachometer period error. Period error is derived by counting tape tachometer period (t) relative to a desired "reference" period ($t_{ref}$). Rewriting the equation for $I_{accel}$ in this manner gives $$I_{accel} = \frac{\ddot{x}_{max}}{2^n - 1} \left( C_4 \frac{R^4 - C_2}{R} + \frac{C_3}{R} \right)(t - t_{ref});$$

where $2^n - 1$ is the largest number which the counter 110 (FIG. 4) monitoring tachometer period servo error $t - t_{ref}$ can achieve.

Position Control Algorithm

In a reel-to-reel tape transport without a stop capstan, it is necessary to provide a position-hold control (stoplock). This is to prevent possible "creep" problems at times when the tape is supposed to be stopped. In addition, if the position control algorithm is well damped and stable, it is possible to use this control to efficiently move the tape from one position to another by slewing the position reference.

To provide this control, $I_{accel}$ is modulated by position error information. Position error is derived from counting tape tachometer pulses (X) relative to a desired "reference" position (Xref).

Rewriting the equation for $I_{accel}$ in this manner gives $$I_{accel} = \frac{\ddot{x}_{max}}{2^n - 1} \left( C_1 \frac{R^4 - C_2}{R} + \frac{C_3}{R} \right)(X - X_{ref}).$$

Both velocity and position error are generated by the dual purpose circuitry described subsequently with respect to FIG. 4.

VELOCITY DAMPING

To provide the velocity damping necessary to stabilize the system during position control, a differentiating filter is used.

A digital output representing $I_{accel}$ is added to tension and drag current components and is then converted to an analog signal through a D/A converter 46, 48 of FIG. 1. This signal is fed into a differentiating filter 50, 52 and on to the power amplifier 54, 56 to drive motor 20, 26.

The output of the differentiating filter contains a component proportional to the rate of change of its input. Thus, a signal is created which modifies the digital "staircase" position control current, depending on how fast the system is moving relative to the reference position.

DETAILED DESCRIPTION

Referring to FIG. 1, a reel-to-reel tape transport control apparatus is shown. Magnetic recording tape is wound upon a supply tape reel 10 and is spooled off onto a take-up tape reel 12. The tape 14 moves past recording head 16. It is also partially wrapped around a free-rolling idler wheel which is coupled to and drives an incremental encoder tape tachometer 18.

The tape reel 10 is driven by a motor 20 via a shaft 22. A supply reel tachometer 24 is coupled to the shaft. Similarly, a motor 26 drives reel 12 by means of a shaft 28. A take-up reel tachometer 30 is coupled to the shaft 28.

The output 32 of the supply reel tachometer 24 and the output 34 of the tape tachometer 18 are connected to radius sensing logic within motion control logic 44. The radius sensing logic logically derives sampled supply reel radius.

A similar arrangement is utilized to derive take-up reel radius by means of the output of take-up reel tachometer 30 and radius sensing logic within logic 44.

The output 34 of the tape tachometer 18 is also supplied to logic 44 which derives sampled tachometer periods and position counts. These three variables, the supply and take-up reel radii and tape tachometer periods are used in motion control logic 44 to derive the proper error correcting current for the supply and take-up reel motors. The output of the motion control logic 44 is in digital form and drives digital-to-analog converters 46, 48. The outputs of the digital digital-to-analog converters 46 and 48 are fed to compensating active filters 50 and 52. The low level output of the filters is fed to closed loop current mode power amplifiers 54, 56, which supply motor current to the supply reel motor 20 and the take-up reel motor 26.

To accelerate the tape from a stop condition to the full running speed with negligible tension transients and consistent start profiles requires a dynamically adaptive control circuit. This circuit is needed to compensate for system parameters which range as a function of the radius of tape on the supply and take-up reels. The radius information is derived as described below with reference to FIG. 3, that is, by sampling idler tachometer count every $2\pi$ radians of reel displacement.

Figure 3:
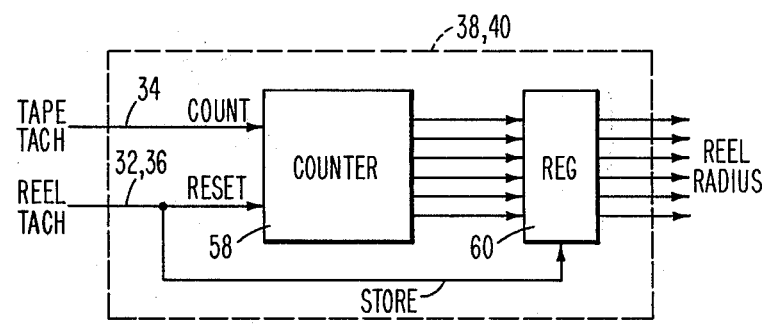
FIG. 3 is a detailed logic diagram of the reel tachometer compare logic of FIG. 3.

Referring now to FIG. 3, reel radius is derived by comparing the output of the digital reel tachometer mounted on the motor shaft with the output of the digital tape tachometer. A counter 58 is driven by the output of the tape tachometer. Reel radius is sampled once per reel revolution and output 32 for the supply reel or 36 for the take-up reel drives the reset input to the counter 58 and also the store input to a register 60. Therefore, the count of the tape tachometer is stored in the register 60 once per reel revolution. This count is proportional to the instantaneous reel radius. This relationship can be shown by the mathematical treatment which follows.

Referring to FIG. 1, at the tape reel 10 the lineal displacement $S$ of the tape from the reel equals the radius times the angular displacement ($\theta$):

$$S = R\theta$$

At the tape tachometer 18, the displacement of tape is the same as $S$. If $X_t$ is equal to the tachometer spacing and $N$ is equal to the number of tachometer pulses within the lineal displacement $S$, then the following relationship exists:

$$S = NX_t$$

Equating lineal displacements:

$$R\theta = NX_t$$

Solving this equation for $R$ gives the following:

$$R = \frac{X_t}{\theta} N$$

If radius is sampled once per reel revolution, that is, $\theta = 2\pi$, then the following relationship exists:

$$R = \frac{X_t}{\theta} N = KN \quad (K = \text{proportionality constant})$$

Figure 4:
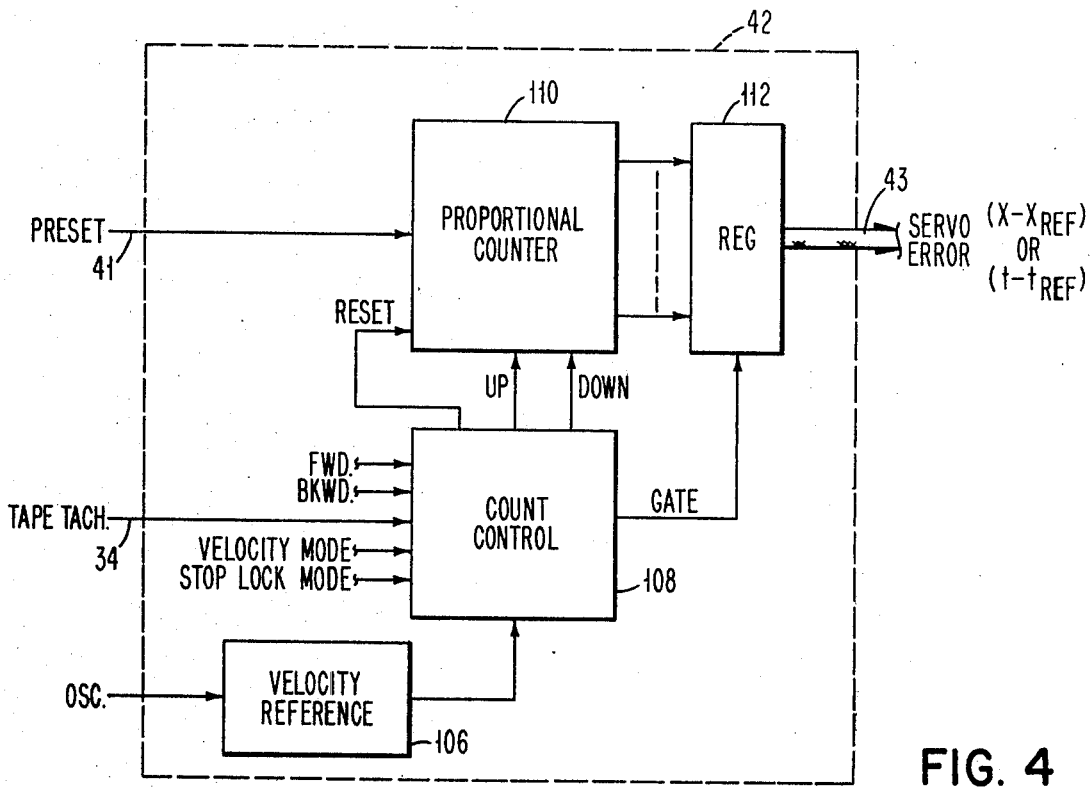
FIG. 4 is a detailed diagram of the error algorithm logic 42.

Referring now to FIG. 4, the dual purpose error algorithm logic block 42 for calculating velocity or position servo error will be described. A proportional counter 110 is provided and clocked by a velocity reference 106. In velocity mode, tape velocity is monitored. The counter is preset via line 41 to a negative number which represents nominal tape tachometer period. Count control 108 causes oscillator pulses from velocity reference 106 to be generated on the up output line to thereby cause the proportional counter to increment until a tape tachometer pulse occurs on tape tachometer line 34. At that time, if the tape is running at nominal speed the counter would have counted up to zero representing zero velocity error. When the tachometer pulse occurs, a signal is generated by the count control 108 on the gate line to cause the contents of the counter 110 to be stored in register 112. The counter is again preset to the negative reference and a new count cycle is begun. The result in the register each time represents the tachometer period ($t$) minus the reference tachometer period (tref) for nominal velocity. A positive or negative number in register 112 represents the servo error (*t*-tref) from nominal.

In stop-lock mode, the tape position is monitored. This is accomplished by utilizing the proportional counter 110 to directly count tape tachometer pulses appearing on line 34 instead of velocity pulses as was done in velocity mode. In stop-lock mode, a signal on the stop-lock mode input to count control 108 causes the gate output to hold the register 112 open to reception of count pulses from the counter. The count control energizes the up input to the counter if the forward line is energized and energizes the down input to the counter if the tape unit is running backwards. The output of the register 112 now represents tape position error (X-Xref) rather than velocity errors. This allows position feedback in the servo loop instead of velocity feedback. Assume the tape unit is holding the tape stationary in stop-lock mode and the tape begins to drift away from nominal position (Xref). As the tape inches forward, eventually a tape tachometer pulse would be generated which causes the count control to pulse the up input. This causes the counter to increment. The count is fed back into the servo system to counteract the creeping motion by calculating motor current necessary to drive the tape in the opposite direction. The tape then reverses direction. The controls sense a backward motion, the tape tachometer pulses through the count control 108 causing pulses to occur on the down-input thus reducing the position count to zero. The output of the proportional counter in either the velocity mode or the stop-lock mode goes through the same calculation logic for deriving motor current.

Figure 5:
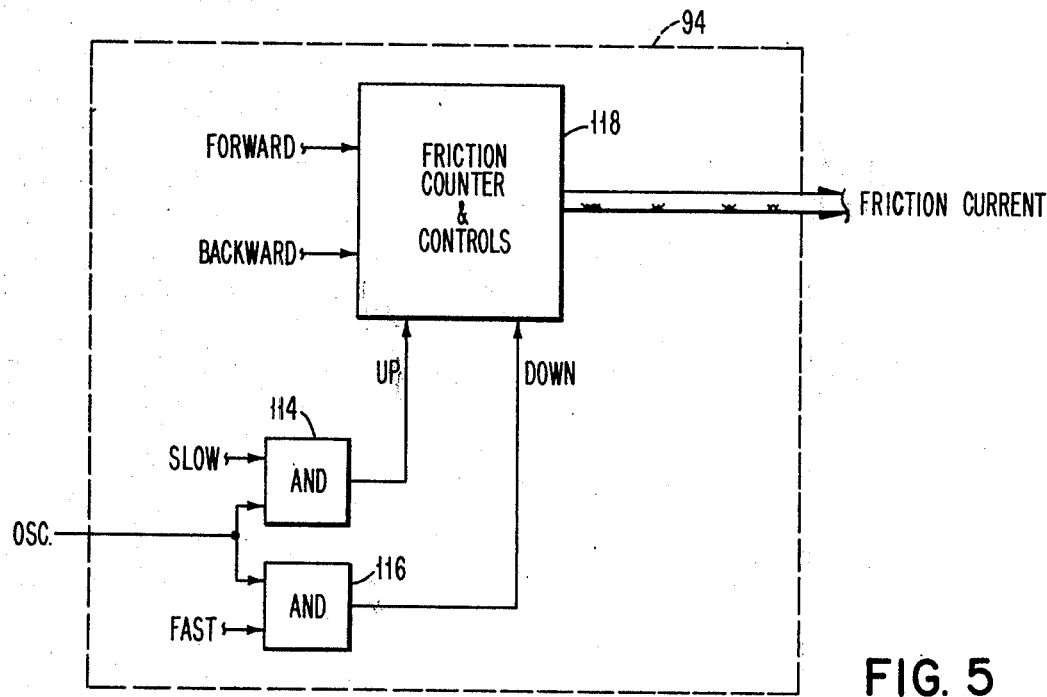
FIG. 5 is a detailed diagram of the friction current circuit 94.

Referring now to FIG. 5, the friction current logic 94 will be described. Friction current is calculated by monitoring the velocity error and integrating it to zero. The counter 118 is incremented when tape is running slow and decremented when tape is running fast. When the tape is running within the range of some nominal velocity, for example, plus or minus 1% of nominal, there is no change in the counter. The output of the counter is used as an indication of the friction in the tape drive and this is added into the motor current calculation directly. The friction current is only calculated when running at nominal speed and is not calculated during acceleration and deceleration or within the predetermined limits of plus or minus nominal speed.

An alternate method of handling friction current is to assume it is constant and to use a predetermined fixed value for it in calculating motor current. Friction current may also be ignored, and the servo will respond by running slightly slow to generate the required motor currents to overcome friction.

Figure 2:
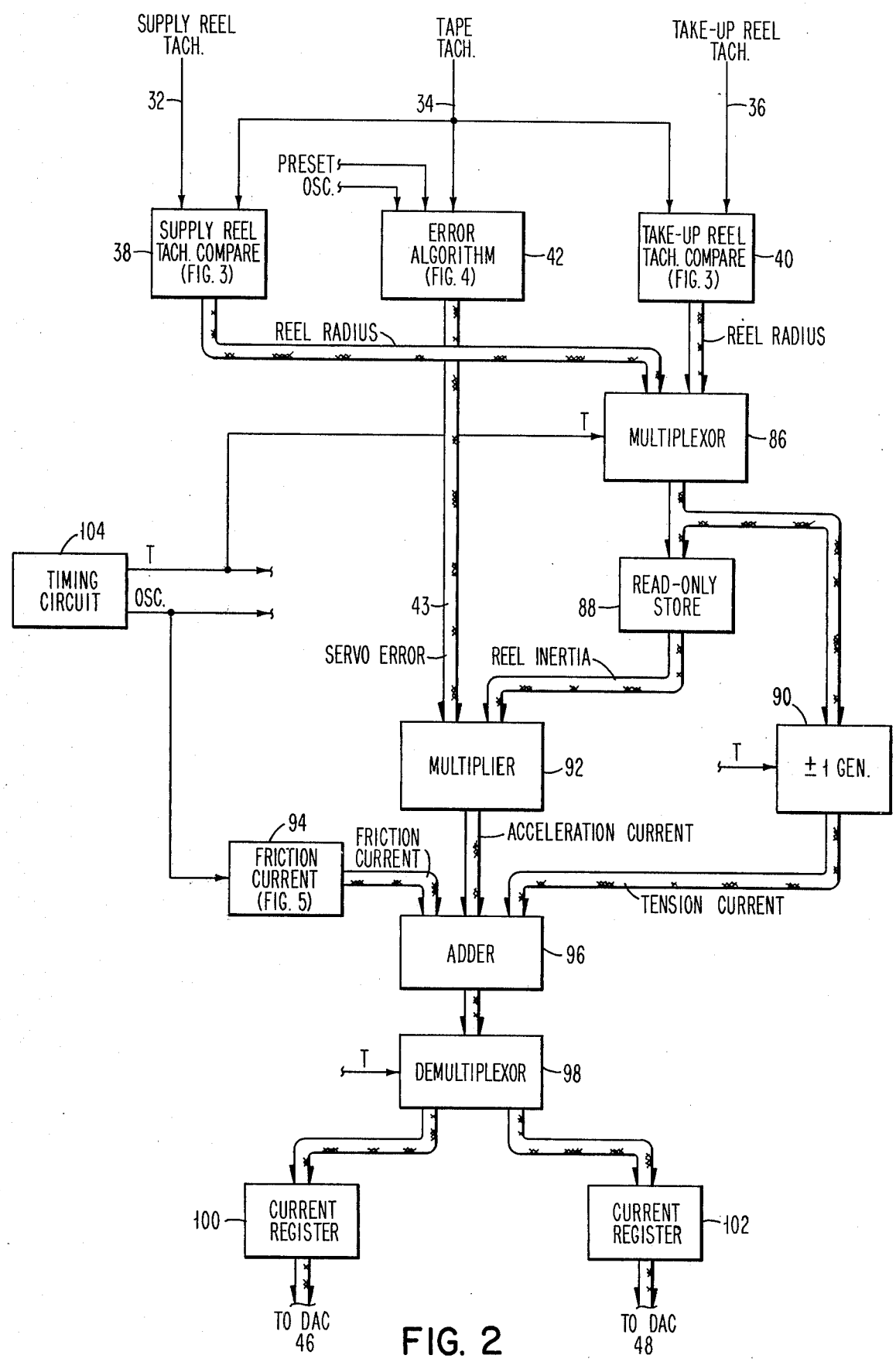
FIG. 2 is a block diagram of the motion control logic of FIG. 1.

The motion control logic 44 shown in FIG. 1, is shown in more detail in FIG. 2. The supply reel tachometer compare circuitry 38 and 40 are identical and were described previously with reference to FIG. 3. The error control algorithm logic block 42 was described previously with reference to FIG. 4. The friction current logic 94 was described previously with reference to FIG. 5.

In the particular embodiment shown, the motion control logic is multiplexed so that the calculations for each reel can be performed by common equipment which is shared by means of the multiplexing technique. A timing circuit 104 is provided which produces a signal on the line T which is positive when the common shared logic is being used by the supply reel tachometer and is negative when the common shared logic is being used for take-up reel calculations. Thus, the supply reel tachometer output 32 is combined with the tape tachometer output 34 in the supply reel tachometer compare 38, the output of which is a digital value corresponding to the instantaneous reel radius as previously described with reference to FIG. 3.

In a similar manner, the take-up reel tachometer output 36 is combined with the tape tachometer output 34 in the take-up reel compare logic 40. The output of this logic is the sampled reel radius for the take-up reel. The output of logic 38 and the output of logic 40 are applied to a multiplexor 86 such that when the signal input T is positive, the supply reel radius is gated by the multiplexor to the read only store 88. The read only store contains binary values representing the inertia of the reel. The reel radius is used as an address to select the value in the read only store which corresponds to the inertia of the reel for that radius. The reel radius is used to address this term since the inertia is a function of reel radius only.

The reel radius is also applied to $a + 1$ or $-1$ generator (depending upon whether the supply reel motor current or take-up reel motor current is being calculated) which generates a value which is proportional to the tension current.

The output of the read only store 88 is applied to one input of multiplier 92. The other input to the multiplier is the servo error which is generated as previously described with reference to FIG. 4. The servo error is either a tape position error or a tape velocity error depending upon whether the apparatus is in stop-lock mode or velocity mode respectively.

The output of the multiplier 92 is a digital value representing the required acceleration current for velocity control or position control as previously described. The acceleration current is added to the friction current output of logic 94 and the tension current output of logic 90 in the adder 96. A demultiplexor 98 is connected to the output of the adder so that the motor current can be stored in the proper current register 100 or 102 depending upon whether the value applies to the supply reel or the take-up reel, respectively. The output of each of the current registers goes to the corresponding digital-to-analog converter (DAC) 46 or 48 as shown and previously described with reference to FIG. 1.

For simplicity, the motor current formula has been scaled to unity, and therefore, the generator 90 only generates ±1 rather than a specified constant.

Summary

What has been described is a reel-to-reel tape transport apparatus which has no tape length buffering between the supply and take-up reels. The tape follows a fixed length path from the supply reel past a read/write head and guide to a take-up reel. There are two motor control mechanisms, one which drives the take-up reel and another which drives the supply reel to maintain appropriate tension and tape motion at the read/write head. A motion control mechanism is provided which is adaptive to dynamic changes in the amount of tape wound upon each reel as the tape is moved from the supply reel to the take-up reel and vice versa. The transport apparatus is a closed-loop servo control system which includes means for monitoring lineal tape position and means for monitoring angular reel displacement of the supply and take-up reels. Motion control logic responds to the monitoring means and derives reel radii and tape inertial values corresponding to the instantaneous reel radius and from this information calculates tape position or velocity error. Arithmetic logic calculates from the tape position or velocity error and the inertial values the appropriate torque for each reel to drive the position or velocity error to zero. The arithmetic logic is connected to current generating amplifiers which control the supply and take-up motors to thereby form a closed-loop servo control system.

The result is a reel-to-reel system wherein control of tape motion is accomplished with static and dynamic performance characteristics which are independent of reel radius and inertial changes resulting from tape motion and variations in the amount of tape wound upon the reels.

While the invention has been particularly shown and described with reference to a preferred embodiment thereof it will be understood by those skilled in the art that various changes in form and details may be made therein without departing from the spirit and scope of the invention.

For example, the invention may be embodied in a microprocessor, or programmed logic arrays; analog circuits may be used for the tachometers; analog or mechanical calculators may be used for the arithmetic circuits, or any of a number of well known logic circuits may be employed to practice the invention.

The invention claimed is:

1. A reel-to-reel tape transport apparatus
   wherein an unbuffered length of tape follows a fixed-length path from a supply reel past a read/write head and guide to a take-up reel, and one motor drives the take-up reel and another motor drives the supply reel to maintain appropriate tension and tape motion at the read/write head, characterized by
   a control mechanism which is continually adaptive to dynamic changes as the tape is moved from the supply reel to the take-up reel comprising:
   means for measuring the variable amount of tape displaced each time one of said reels is rotated through a preselected angle;
   motion control logic means responsive to said measuring means, including means for deriving reel radii and tape inertial values corresponding thereto, and including means for calculating tape position error; and
   arithmetic logic means responsive to said measuring means for calculating from said tape position error and said inertial values the appropriate torque for each reel to drive said position error to zero along a predetermined profile with negligible tape tension disturbances.

2. An adaptive reel-to-reel tape transport apparatus for maintaining tape motion control as the amount of tape on each reel changes with time, comprising:
   a storage for storing digital values which correspond to predetermined increments of reel radius;
   at least one reel tachometer for measuring reel angular displacement;
   a tape tachometer for measuring the amount of tape linearly displaced during each successive preselected amount of reel angular displacement;
   counter logic responsive to the measurements by said tape and reel tachometers for calculating the instantaneous radius of tape on at least one of said reels, to provide digital reel radius numbers; and
   means connecting said storage with said logic for causing said storage in response to said reel radius numbers to select the inertial value corresponding to the instantaneous reel radius.

3. The combination according to claim 2, further comprising:
   a comparator for comparing a digital number output from said tape tachometer with a reference digital number for generating a digital error number representing a servo error which is proportional to the difference therebetween, and
   a multiplier responsive to said comparator and said storage for multiplying said digital reel radius number and said error number to thereby produce a resultant digital output product which represents in digital form a correction torque sufficient to reduce said servo error to a minimum.

4. A reel-to-reel magnetic tape transport comprising:
   a supply reel and motor for driving said supply reel;
   a take-up reel and motor for driving said take-up reel;
   means adapted to allow a length of unbuffered tape to extend between said reels and to be wound thereupon;
   a tape tachometer circuit adapted to coact with the tape for providing a signal indicative of actual tape displacement;
   a supply reel tachometer circuit connected to coact with said supply reel for providing a signal indicative of the actual radius of tape wound upon said supply reel;
   a take-up reel tachometer circuit connected to coact with said take up reel for providing a signal indicative of the actual radius of tape material wound upon said take-up reel;
   a storage storing inertial values corresponding to different predetermined reel radii, for generating signals representing inertial values corresponding to actual reel radius signals applied to said storage; and
   control means connected to said motors and responsive to said tachometer circuits and said storage for calculating motor currents in accordance with a predetermined servo algorithm to thereby generate motor currents of a magnitude sufficient to drive said reels in an appropriate direction and by such an amount so as to reduce to zero tape displacement difference from a nominal position.

5. The combination according to claim 4, wherein said storage is a single common storage and said control means includes multiplexing/demultiplexing controls for sharing said common storage between separate closed loop servo paths for said supply reel motor/tachometer circuit, and said take-up reel motor/tachometer circuit.

6. Apparatus for transporting an unbuffered length of web between two reels, comprising:
   a pair of motors, one for driving each of said reels;
   reel tachometer circuit means for measuring angular displacement of at least one of said reels;
   tape tachometer circuit means for measuring the varying amount of tape actually displaced during each successive preselected degree of reel rotation;
   storage means storing inertial values corresponding to different predetermined reel radii; and
   control means connected to said motors and including means responsive to the amount of tape actually displaced during such preselected degree of reel rotation for deriving instantaneous values of reel radii and, using inertial values corresponding to said radii as stored in said storage means, calculating motor currents in accordance with a predetermined servo algorithm thereby to generate motor currents of a magnitude sufficient to drive said reels in an appropriate direction and by such an amount as to maintain web speed and tension at substantially constant values as preselected by said algorithm.

7. Apparatus for transporting an unbuffered length of web along a fixed path between two reels, comprising:
- means for generating for each reel a respective signal whenever such reel is rotated through a predetermined angle as the web is advanced along the path;
- means for measuring the lineal tape displacement during the time interval between successive ones of said signals;
- means responsive to the magnitude of said lineal tape displacement during said time interval to derive instantaneous values of radius of such reel following each such signal;
- means for storing inertial values corresponding to predetermined values of reel radius;
- means responsive to said inertial values to provide acceleration motor currents of corresponding magnitude according to a predetermined servo algorithm for controlling reel rotation; and
- means responsive to each such signal to actuate the last-introduced means to provide continuing changes in acceleration current as reel radius changes.

8. Apparatus according to claim 7, including control means associated with said measuring means and comprising:
- a counter which, during operation of the apparatus in a velocity mode, is periodically preset in response to each of said signals to a predetermined negative number representing a preselected magnitude of said time interval;
- means for incrementing said counter until the next succeeding one of said signals; and
- register means into which the actual count in said counter is gated upon said succeeding signal, the difference between said actual count and zero constituting in magnitude and sign a velocity error indication that modifies operation of said last-introduced means.

9. Apparatus according to claim 7, including control means associated with said measuring means and comprising:
- a counter which, during operation of the apparatus in a stop-lock mode, is preset to zero in response to one of said signals;
- means for incrementing said counter if the web drifts sufficiently to generate a succeeding one of said signals; and
- register means into which the count in said counter is gated upon said succeeding signal to constitute a position error indication which modifies operation of said last-introduced means.

10. A method of measuring the changing inertia of a reel of tape during winding and unwinding of the tape on the reel, comprising the steps of:
- storing in a storage unit inertial values corresponding to predetermined different values of tape reel radius;
- measuring the amount of tape displaced around the reel during successive time intervals, each terminating when the reel is rotated through a predetermined angle;
- using the tape displacement as measured and said predetermined angle to derive the instantaneous radius of the reel; and
- using the radius as derived for looking up the corresponding inertial value in the storage unit.

11. A reel-to-reel tape transport apparatus wherein an unbuffered length of tape follows a fixed-length path from a supply reel past a read/write head and guide to a take-up reel, and one motor drives the take-up reel and another motor drives the supply reel to maintain appropriate tension and tape motion at the read/write head, characterized by
- a control mechanism which is continually adaptive to dynamic changes as the tape is moved from the supply reel to the take-up reel comprising:
- means for measuring the variable amount of tape displaced each time one of said reels is rotated through a preselected angle;
- motion control logic means responsive to said measuring means, including means for deriving reel radii and tape inertial values corresponding thereto, and including means for calculating tape velocity error; and
- arithmetic logic means responsive to said measuring means for calculating from said tape velocity error and said inertial values the appropriate torque for each reel to drive said velocity error to zero along a predetermined profile with negligible tape tension disturbances.

12. A reel-to-reel tape transport apparatus wherein an unbuffered length of tape follows a fixed-length path from a supply reel past a read/write head and guide to a take-up reel, and one motor drives the take-up reel and another motor drives the supply reel to maintain appropriate tension and tape motion at the read/write head, characterized by
- a control mechanism which is continually adaptive to dynamic changes as the tape is moved from the supply reel to the take-up reel comprising:
- means for measuring the variable amount of tape displaced each time one of said reels is rotated through a preselected angle;
- motion control logic means responsive to said measuring means, including means for deriving reel radii and tape inertial values corresponding thereto, and
- arithmetic logic means responsive to said measuring means for calculating from said reel radii values and inertial values the appropriate torque for each reel to maintain tape tension substantially constant.

* * * * *